(12) United States Patent
Kang et al.

(10) Patent No.: US 8,478,972 B2
(45) Date of Patent: Jul. 2, 2013

(54) METHODS AND APPARATUS FOR HANDLING SWITCHING AMONG THREADS WITHIN A MULTITHREAD PROCESSOR

(75) Inventors: Jack Kang, Sunnyvale, CA (US); Hsi-Cheng Chu, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/247,030

(22) Filed: Sep. 28, 2011

(65) Prior Publication Data

US 2012/0066479 A1    Mar. 15, 2012

Related U.S. Application Data

(63) Continuation of application No. 11/836,044, filed on Aug. 8, 2007, now Pat. No. 8,032,737.

(60) Provisional application No. 60/822,347, filed on Aug. 14, 2006.

(51) Int. Cl.
    *G06F 9/40*        (2006.01)

(52) U.S. Cl.
    USPC ............................................ 712/229; 712/43

(58) Field of Classification Search
    USPC ................. 712/43, 228, 229; 718/107, 108
    See application file for complete search history.

(56) References Cited

U.S. PATENT DOCUMENTS

| | | | |
|---|---|---|---|
| 5,490,272 A | 2/1996 | Mathis et al. | |
| 6,049,867 A * | 4/2000 | Eickemeyer et al. | 712/228 |
| 6,205,414 B1 | 3/2001 | Forsman et al. | |
| 6,671,795 B1 * | 12/2003 | Marr et al. | 712/220 |
| 7,127,561 B2 * | 10/2006 | Hill et al. | 711/145 |
| 7,162,666 B2 | 1/2007 | Bono | |
| 7,263,599 B2 * | 8/2007 | Norden et al. | 712/205 |
| 7,302,554 B2 | 11/2007 | Yamazaki | |
| 7,340,742 B2 | 3/2008 | Tabuchi | |
| 7,360,203 B2 * | 4/2008 | Ober et al. | 717/128 |
| 7,363,450 B1 | 4/2008 | Fedorova | |
| 7,457,931 B1 | 11/2008 | Fedorova | |
| 2002/0161957 A1 * | 10/2002 | Comeau et al. | 710/260 |
| 2002/0194249 A1 | 12/2002 | Hsieh | |
| 2002/0194250 A1 | 12/2002 | Hsieh | |
| 2003/0037117 A1 | 2/2003 | Tabuchi | |
| 2003/0126416 A1 * | 7/2003 | Marr et al. | 712/235 |

(Continued)

FOREIGN PATENT DOCUMENTS

| | | |
|---|---|---|
| WO | 99/21082 A1 | 4/1999 |
| WO | 00/68778 A2 | 11/2000 |
| WO | 00/68778 A3 | 8/2001 |
| WO | 00/68778 A3 | 4/2002 |

*Primary Examiner* — Aimee Li

(57) ABSTRACT

A system, apparatus and method for handling switching among threads within a multithread processor are described herein. Embodiments of the present invention provide a method for multithread handling that includes fetching and issuing one or more instructions, corresponding to a first instruction execution thread, to an execution block for execution during a cycle count associated with the first instruction execution thread and when the instruction execution thread is in an active mode. The method further includes switching a second instruction execution thread to the active mode when the cycle count corresponding to the first instruction execution thread is complete, and fetching and issuing one or more instructions, corresponding to the second instruction execution thread, to the execution block for execution during a cycle count associated with the second instruction execution thread. The method additionally includes resetting the cycle counts when a master instruction execution thread is in the active mode.

21 Claims, 3 Drawing Sheets

U.S. PATENT DOCUMENTS

| | | |
|---|---|---|
| 2004/0215939 A1 | 10/2004 | Armstrong et al. |
| 2005/0081214 A1 | 4/2005 | Nemirovsky et al. |
| 2005/0108711 A1 | 5/2005 | Arnold et al. |
| 2005/0149931 A1 * | 7/2005 | Lin et al. ................ 718/100 |
| 2005/0160254 A1 * | 7/2005 | Lin et al. ................ 712/228 |
| 2005/0223302 A1 | 10/2005 | Bono |
| 2006/0146864 A1 | 7/2006 | Rosenbluth et al. |
| 2006/0206692 A1 | 9/2006 | Jensen |

\* cited by examiner

METHODS AND APPARATUS FOR HANDLING SWITCHING AMONG THREADS WITHIN A MULTITHREAD PROCESSOR

CROSS-REFERENCE TO RELATED APPLICATION

This application is a continuation of U.S. application Ser. No. 11/836,044, filed Aug. 8, 2007, which claims priority under 35 U.S.C. §119(e) to U.S. Provisional Application No. 60/822,347, filed Aug. 14, 2006. The disclosures of the applications referenced above are incorporated herein by reference

TECHNICAL FIELD

Embodiments of the present invention relate to the field of data processing, and more particularly, to methods and apparatus for handling switching among threads within a multithread processor.

BACKGROUND

Modern multi-core processors have multiple pipelines to run multiple applications and as a result often improve performance for a system simultaneously running multiple tasks. Unfortunately, these multi-core processors also require substantially more power and use more area than a comparable single pipeline processor.

Prior art single pipeline processors may allow multithread processing by employing an operating system to manage hardware resource usage and thread switching. However, a significant performance penalty is incurred each time the processor changes threads.

Although processing multiple threads on a single processor core is desirable, in certain situations it may be necessary or desirable to disable one or more of the threads. For example, it may be useful to disable one or more threads while debugging and performing other testing on a multithread system. In another situation, an application may require, or may perform more optimally, using less than all available threads.

Additionally, in order for the thread to perform more optimally, methods and systems are needed for scheduling of threads within a pipeline processor to help ensure fairness while helping prevent rogue behavior.

SUMMARY OF THE INVENTION

In view of the problems in the state of the art, embodiments of the present invention are directed to methods and apparatus for handling switching among threads within a multithread processor. A multithread processing system is described, suitable to solve the problems, which at least one embodiment of the present invention is based upon, that includes an execution block configured to execute instructions. The multithread system also includes an instruction dispatch block that is operatively coupled to the execution block and that is configured to fetch and issue instructions corresponding to an instruction execution thread when the instruction execution thread is in an active mode, wherein the instruction dispatch block is configured to control a cycle count corresponding to an instruction execution thread when the instruction execution thread is in the active mode and switch another instruction execution thread to the active mode when the cycle count corresponding to the instruction execution thread is complete. The instruction dispatch block is also configured to reset each cycle count when a master instruction execution thread is in the active mode.

More specifically, with the foregoing and other considerations in view, there is provided, in accordance with various embodiments of the present invention, a method for multithread handling that includes fetching and issuing one or more instructions, corresponding to a first instruction execution thread, to an execution block for execution during a cycle count associated with the first instruction execution thread and when the first instruction execution thread is in an active mode. The method further includes switching a second instruction execution thread to the active mode when the cycle count associated with the instruction execution thread is complete, and fetching and issuing one or more instructions, corresponding to the second instruction execution thread, to the execution block for execution during a cycle count associated with the second instruction execution thread. The method additionally includes resetting the cycle counts when a master instruction execution thread is in the active mode.

In accordance with various embodiments, the method further includes programming at least one cycle count to a new level when the master instruction execution thread is in the active mode, wherein upon a subsequent entry into the active mode by the master instruction execution thread, the at least one cycle count resets to the new level.

In accordance with various embodiments, the method further includes determining if the first instruction execution thread and/or the second instruction execution thread is disabled, and wherein if the first instruction execution thread and/or the second instruction execution thread is disabled the disabled instruction execution thread is not allowed to enter the active mode.

In accordance with various embodiments, the method further includes programming a cycle count of the disabled instruction execution thread to a new level when the master instruction execution thread is in the active mode, wherein when the disabled instruction execution thread is subsequently enabled and enters the active mode, the cycle count is set to the new level.

In accordance with various embodiments, a cycle count is updated during each cycle when a corresponding instruction execution thread is in the active mode.

In accordance with various embodiments, the method further includes disabling an instruction execution thread while it is in the active mode and switching another instruction execution thread to the active mode.

In accordance with some embodiments, the disabled instruction execution thread disables itself.

In accordance with some embodiments, the disabled instruction execution thread remains disabled until the master instruction execution thread enables it.

In accordance with some embodiments, any remaining instructions within the disabled instruction execution thread are flushed and the disabled instruction execution thread begins with an instruction that was next prior to disablement during a subsequent active mode.

In accordance with various embodiments, the method further includes interrupting an instruction execution thread while it is in an active mode, and fetching and issuing different instructions corresponding to the interrupted instruction execution thread to the execution block.

In accordance with some embodiments, the interrupted instruction execution thread remains in an active mode and continues to fetch and issue the different instructions beyond the cycle count until the different instructions are complete.

In accordance with various embodiments, the cycle count for each thread is reset upon completion of the different instructions.

In accordance with some embodiments, the instruction execution thread remains in an active mode and continues to fetch and issue the different instructions beyond the cycle count until the different instructions are complete only if an interrupt priority bit is set.

In accordance with some embodiments, the cycle count for each thread is reset upon completion of the different instructions.

In accordance with various embodiments, the instruction execution thread remains in the active mode beyond the cycle count until all of its corresponding instructions are completed.

A multithread processing device is also described, suitable to solve the problems which at least one embodiment of the invention is based on, that includes means for executing instructions. The multithread processing device also includes means for fetching and issuing instructions that is operatively coupled to the means for executing instructions. The means for fetching and issuing instructions is configured to fetch and issue instructions corresponding to an instruction execution thread when the instruction execution thread is in an active mode. The means for fetching and issuing instructions is also configured to control a cycle count associated with an instruction execution thread when the instruction thread is in the active mode, switch another instruction execution thread to the active mode when the cycle count associated with the instruction execution thread is complete, and to reset each cycle count when a master instruction execution thread is in the active mode.

In various embodiments, the means for executing instructions may include any instruction execution means such as a processing core co-disposed in an integrated circuit package with the means for fetching and issuing instructions. In some embodiments, the means for fetching and issuing instructions may include any instruction dispatch means, such as an instruction unit responsible for ensuring that instructions are properly decoded, fetched, queued, and dispatched for execution. Besides containing control circuitry for performing these functions, the means, for fetching and issuing instructions may also include additional storage means, such as an instruction cache and/or a data cache.

In accordance with again an additional feature of at least one embodiment of the present invention, the processing device is a processor. In accordance with still a further feature of at least one embodiment of the present invention, the processing device is an embedded processor. In accordance with a concomitant feature of the present invention, the processing device is an integrated circuit.

Other features that are considered as characteristic for embodiments of the invention are set forth in the appended claims.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use the phrases "in an embodiment," "in embodiments," or "in various embodiments," which may each refer to one or more of the same or different embodiments. Furthermore, the terms "comprising," "including," "having," and the like, as used with respect to embodiments of the present invention, are synonymous. The phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)," that is, A is an optional element.

"Circuitry," as used in any embodiment herein, may comprise, for example, singly or in any combination, hardwired circuitry, programmable circuitry, state machine circuitry, and/or firmware that stores instructions executed by programmable circuitry.

Figure 1:
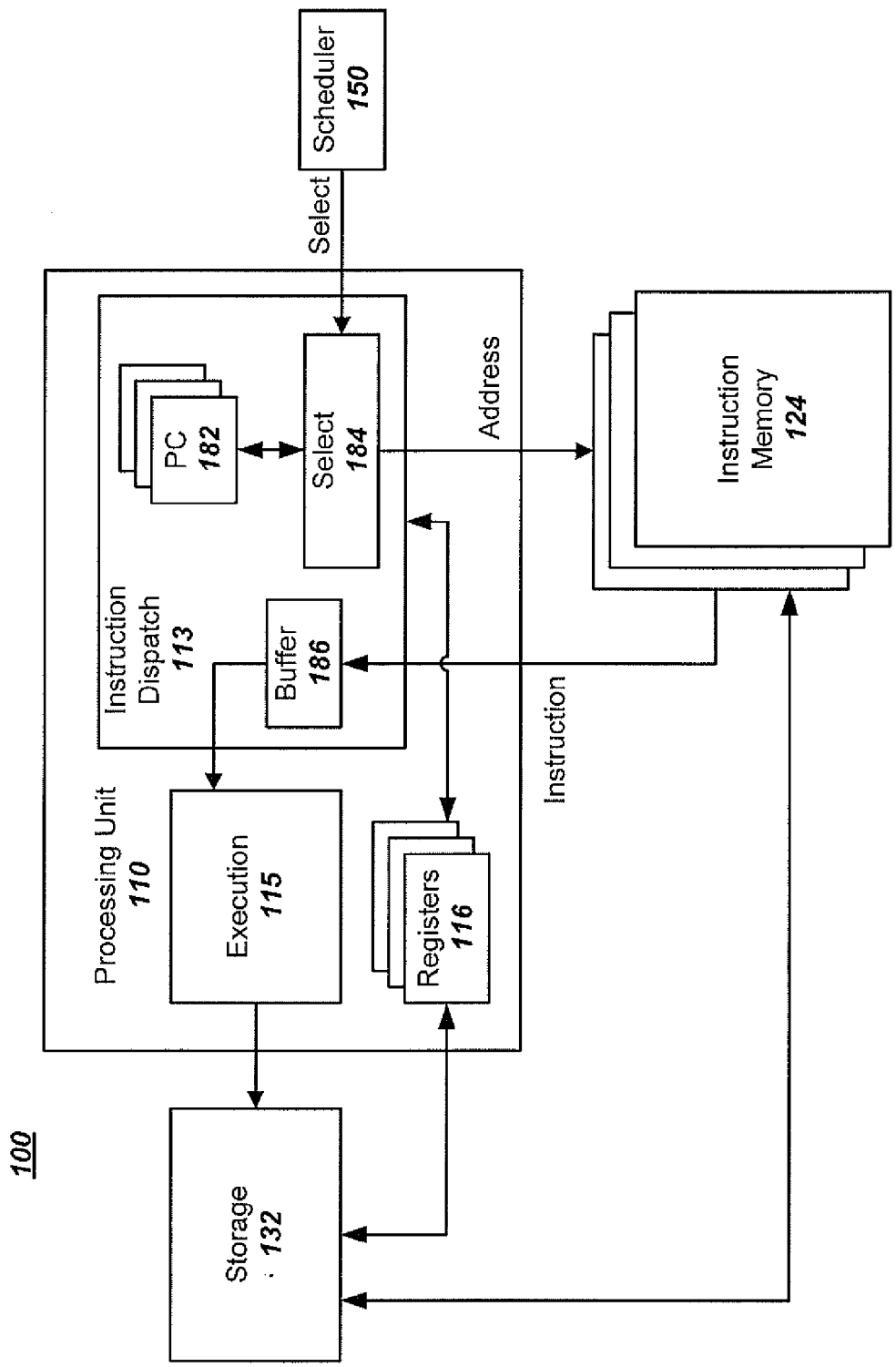
FIG. 1 a block diagram of a multithread system, in accordance with various embodiments of the present invention.

Referring to FIG. 1, a block diagram illustrates an exemplary multithread processing system 100 including multithread processing unit 110 with execution block 115, instruction dispatch block 113, and registers 116 that are operatively coupled to each other at least as shown. In alternate embodiments, the present invention may be practiced with other processing environments and may include various system devices in addition to or instead of the illustrated system devices.

In various embodiments, processing unit 110 may include execution block 115 to execute instructions and instruction dispatch block 113 to fetch and issue instructions for execution by execution block 115. Instruction dispatch block 113 may be configured to interleavingly fetch and issue instructions from multiple instruction execution threads for execution by execution block 115. Such a configuration may improve the performance (e.g., per area/power) for a system running multiple tasks simultaneously. Instruction dispatch block 113 may also fetch and issue instructions from at least a first instruction execution thread and a second instruction execution thread, for execution by execution block 115. Instruction dispatch block 113 may further fetch and issue instructions from multiple instruction execution threads concurrently for execution by the execution block 115.

In various embodiments, instruction dispatch block 113 may provide for a thread switch when changing between instruction execution threads. As such, an instruction from a second thread may be executed immediately after an instruction from a first thread, such that the respective instructions are executed on subsequent cycles.

In various embodiments, instruction dispatch block 113 is operatively coupled to execution block 115 and includes at least one program counter 182 for each instruction execution thread to interleave the threads and to switch processing unit 110 between threads by switching which program counter 182 provides the next instruction. Accordingly, switching may associate each thread with a unique allocated program counter 182. Instruction dispatch block 113 may associate a first program counter 182 with a first instruction execution thread and at least one other program counter 182 with each additional instruction execution thread. Each instruction execution thread may have a different program counter 182.

In various embodiments, instruction dispatch block 113 may alternatively provide switching using dedicated registers 116 associated with each thread. One or more of thread registers 116 may each be configured to load into program counter 182 the address of the next instruction to be executed based on which thread is selected next. Thread registers 116 may also include the number of cycles a particular thread should be active.

Multi-thread processing system 100 of FIG. 1 also illustrates various closely associated system devices, any one or more of which may be operatively coupled to processing unit 110 including buffer 186, instruction memory 124, scheduler 150, and storage 132. In various embodiments, instruction memory 124 may include various memory and/or cache structures configured to store instructions and/or data relating to the various threads in a manner to provide timely responses to fetch requests from instruction dispatch block 113. The cache structures may include multiple levels of caches (e.g., L1 and/or L2 cache).

In various embodiments, scheduler 150 controls the interleaving fetching and issuing of instructions by instruction dispatch block 113. In one embodiment, scheduler 150 outputs an execution thread selection signal to select block 184 in instruction dispatch block 113 to control interleavingly fetching and issuing of instructions by instruction dispatch block 113. In one embodiment, scheduler 150 controls interleavingly fetching and issuing of instructions by instruction dispatch block 113, based at least in part on corresponding contiguous execution clock cycle allocations of the instruction execution threads. In one embodiment, instruction dispatch block 113 is adapted to fetch and issue at least one instruction from an instruction cache 130 for a selected one of a first and a second instruction execution thread each time instruction dispatch block 113 is signaled by scheduler 150 to fetch instructions for the selected one of the first and second instruction execution threads. While illustrated in FIG. 1 separately, scheduler 150 may be included within processing unit 100, and further, as part of instruction dispatch block 113.

Storage 132 may include semiconductor firmware memory, programmable memory, non-volatile memory, read only memory (ROM), electrically programmable memory, random access memory (RAM), flash memory (which may include, for example, NAND or NOR type memory structures), magnetic disk memory, and/or optical disk memory. Either additionally or alternatively, storage 132 may comprise other and/or later-developed types of computer-readable memory including electrical, optical, acoustical or other form of propagated signals (e.g., carrier waves, infrared signals, digital signals). Machine-readable firmware program instructions may be stored in storage 132. In various embodiments, storage 132 includes any storage medium or machine-accessible medium and/or any storage mechanism that provides (i.e., stores and/or transmits) information in a form readable by a machine (e.g., a computer).

In various embodiments, registers 116 may comprise one or more thread-control registers for controlling, at least in part, the multithread processing system 100. One or more of the thread-control registers may be associated with a particular instruction execution thread. For example, registers 116 may include a first thread-control register associated with a first instruction execution thread and may further include at least one other thread-control register associated with at least one other instruction execution thread.

In various embodiments, one or more of the thread-control registers may each include a thread-control bit for selectively disabling an instruction execution thread associated with the thread-control register. A thread-control bit may modifiable (e.g., toggled between a logic high state and a logic low state) to control the disabling and enabling of the associated instruction execution thread. Registers 116 may include a first thread-control register associated with a first instruction execution thread and including a first thread-control bit for selectively disabling the first instruction execution thread. Registers 116 may further include a second thread-control register associated with a second instruction execution thread and including a second thread-control bit for selectively disabling the second instruction execution thread. Registers 116 may further include additional thread-control registers, depending on the specific application.

In various embodiments, one or more of the thread-control registers may be selectively accessible to one or more of the instruction execution threads. For example, access to a thread-control register and/or a thread-control bit may be limited to the associated instruction execution thread. Access to a first thread-control register and/or a first thread-control bit associated with a first instruction execution thread may be configured so that only the first instruction execution thread may access the first thread-control register and/or a first thread-control bit. Access to a thread-control register may also be accessible to not only the associated instruction execution thread but also by any one or more of the other instruction execution threads. One or more of the thread-control registers may be further accessible to non-associated instruction execution threads while another one or more of the thread-control registers may be accessed by only the associated instruction execution thread. Such a configuration may be desired in applications wherein a master instruction execution thread may access registers of any one or more other threads ("child threads"), but not vice versa, so that it is impossible for all threads (child and master threads) to be disabled at the same time. It is noted that in various embodiments, the term "access" may include either one or both of read access and write access.

In various embodiments, instruction dispatch block 113 may be configured to fetch and issue at least one instruction of an instruction execution thread upon the disablement of the instruction execution thread. For example, when an instruction execution thread is disabled, the instruction execution thread may be allowed to finish processing any one or more instructions already in an instruction pipeline.

In various embodiments, instruction dispatch block 113 may be configured to stop fetching and issuing instructions of an instruction execution thread immediately upon the disablement of the instruction execution thread. For example, when an instruction execution thread is disabled, the disabling instruction may be the last instruction the instruction execution thread may be allowed to process, while any remaining instruction(s) in the instruction pipeline are ignored. In some embodiments, any instruction(s) remaining in the instruction pipeline may be flushed from multithread processing unit 110 (e.g., flushed from buffer 186).

In various embodiments, instruction dispatch block 113 may be configured such that whether another instruction is fetched and issued is based at least in part on whether an instruction execution thread is disabling itself or another instruction execution thread. For instance, instruction dispatch block 113 may be configured to fetch and issue at least one instruction of a first instruction execution thread upon the disablement of the first instruction execution thread if a second instruction execution thread disabled the first instruction execution thread. However, instruction dispatch block 113 may also be configured to stop fetching and issuing instructions of the first instruction execution thread immediately, without fetching and issuing any other instructions, upon the disablement of the first instruction execution thread if the first instruction execution thread disabled itself. For example, FIG. 2A is a flow diagram illustrating a method 2660 for handling switching among threads within a multithread processor. The method 260 comprises, at 264, switching a first instruction execution thread to an active mode. The method further comprises, at 268, while the first instruction execution thread is in the active mode, disabling the first instruction execution thread; wherein if the first instruction execution thread is disabled by the first instruction execution thread, switching the second instruction execution thread to the active mode comprises switching the second instruction execution thread such that no instruction corresponding to the first instruction execution thread is fetched and issued (i) subsequent to disabling the first instruction execution thread, and (ii) prior to switching a second instruction execution thread to the active mode, and wherein if the first instruction execution thread is disabled by the second instruction execution thread, switching the second instruction execution thread to the active mode comprises switching the second instruction execution thread such that an instruction corresponding to the first instruction execution thread is fetched and issued (i) subsequent to disabling the first instruction execution thread, and (ii) prior to switching the second instruction execution thread to the active mode. The method further comprises, at 272, in response to disabling the first instruction thread, switching the second instruction execution thread to the active mode.

In various embodiments, registers 116 may comprise one or more thread-operation registers for controlling, at least in part, access to one or more elements of multithread processing system 100. A thread-control register may include one or more thread-operation bits for selectively locking one or more instruction execution threads. For example, a first instruction execution thread may modify a thread-operation bit to lock the first instruction execution thread to prevent a second instruction execution thread from disabling the first instruction execution thread. Such a configuration may allow multithread processing unit 110 to avoid various possibly undesirable situations. For example, such a configuration may avoid conflicts due to multiple instruction execution threads attempting to access a particular thread-control register at the same time to disable and/or enable the instruction execution thread associated with that particular thread-control register.

In various embodiments, the thread-operation bit may be modifiable by an instruction execution thread (e.g., toggled between a logic high state and a logic low state) to control the locking and unlocking ("locking" may sometimes be referred to herein as "releasing" of the lock) of an instruction execution thread. The thread-operation bit may be configured to lock multiple instruction execution threads at a time.

In various embodiments, the thread-operation bit may be accessible to more than one instruction execution thread. The thread-operation bit may be accessible to only a limited number of instruction execution threads at any given time. For example, the thread-operation bit may be accessible to a single instruction execution thread at a time.

In various embodiments, multithread processing unit 110 may be configured to perform various operations atomically. For example, multithread processing unit 110 may be configured to atomically disable an instruction execution thread and release a lock on the instruction execution thread (which may sometimes collectively be referred to herein as a "thread suicide operation"). Such a configuration may allow multithread processing unit 110 to avoid various possibly undesirable situations including, for example, carrying resource issues and deadlocking, which may occur if an instruction execution thread obtains a lock and then disables itself. In that situation, the disabling instruction may be the last instruction the instruction execution thread is capable of processing and thus, would not be capable of releasing the lock.

In various embodiments, registers 116 may comprise one or more thread-suicide registers for performing a thread suicide operation for an instruction execution thread. A thread-suicide register may include a thread-suicide instruction, which may be processed by multithread processing unit 110 to atomically disable an instruction execution thread and release the lock on the instruction execution thread.

In various embodiments, multithread processing unit 110 may be configured to require an instruction execution thread to first be locked prior to performing a thread suicide operation for the instruction execution thread. Multithread processing unit 110 may be configured to ignore or otherwise not respond to a thread-suicide instruction issued by an instruction execution thread. However, if an instruction execution thread issues a thread-suicide instruction without having first been locked, multithread processing unit 110 may be configured to process the thread-suicide instruction as though an instruction for locking the instruction execution thread was first issued. In other words, multithread processing unit 110 may first lock the instruction execution thread and then process the thread-suicide instruction.

In various embodiments, instruction dispatch block 113 may be configured to stop fetching and issuing instructions of an instruction execution thread immediately upon the atomic disablement/lock-release of the instruction execution thread. For example, when multithread processing unit 110 atomically disables an instruction execution thread and releases the lock on the instruction execution thread, any remaining instruction(s) in the instruction pipeline for the instruction execution thread may be ignored. Any instruction(s) remaining in the instruction pipeline may be flushed from multithread processing unit 110 (e.g., flushed from buffer 186). Instructions in the instruction pipeline may be ignored or flushed even if an instruction execution thread is disabled by another instruction execution thread.

Figure 2:
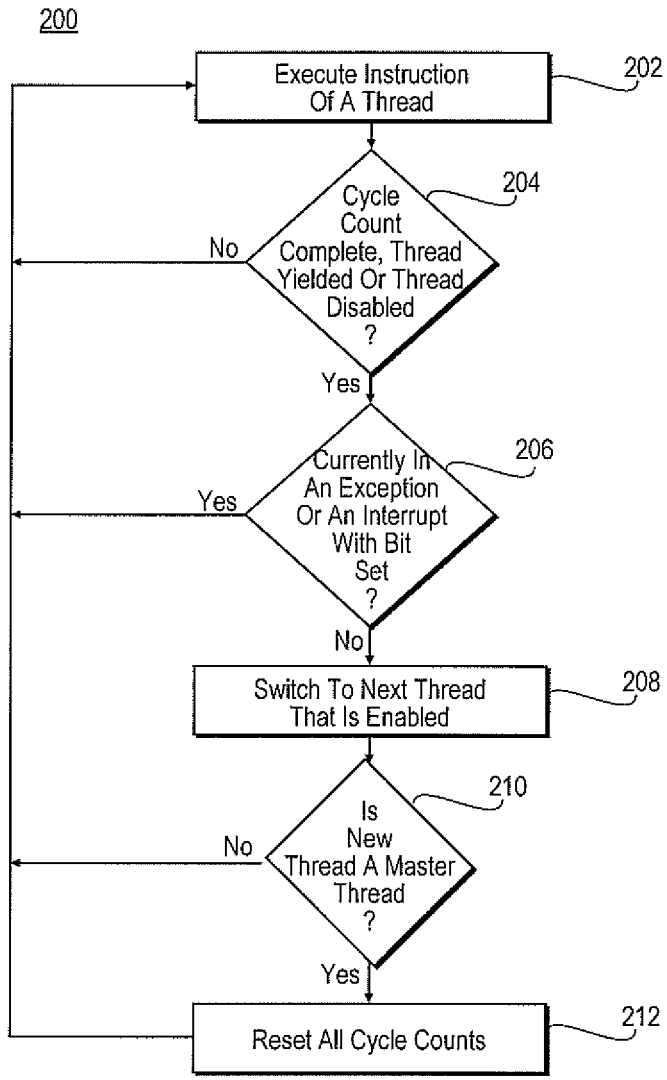
FIG. 2 is a flow diagram illustrating a method for handling switching among threads within a multithread processor.
Figure 2A:
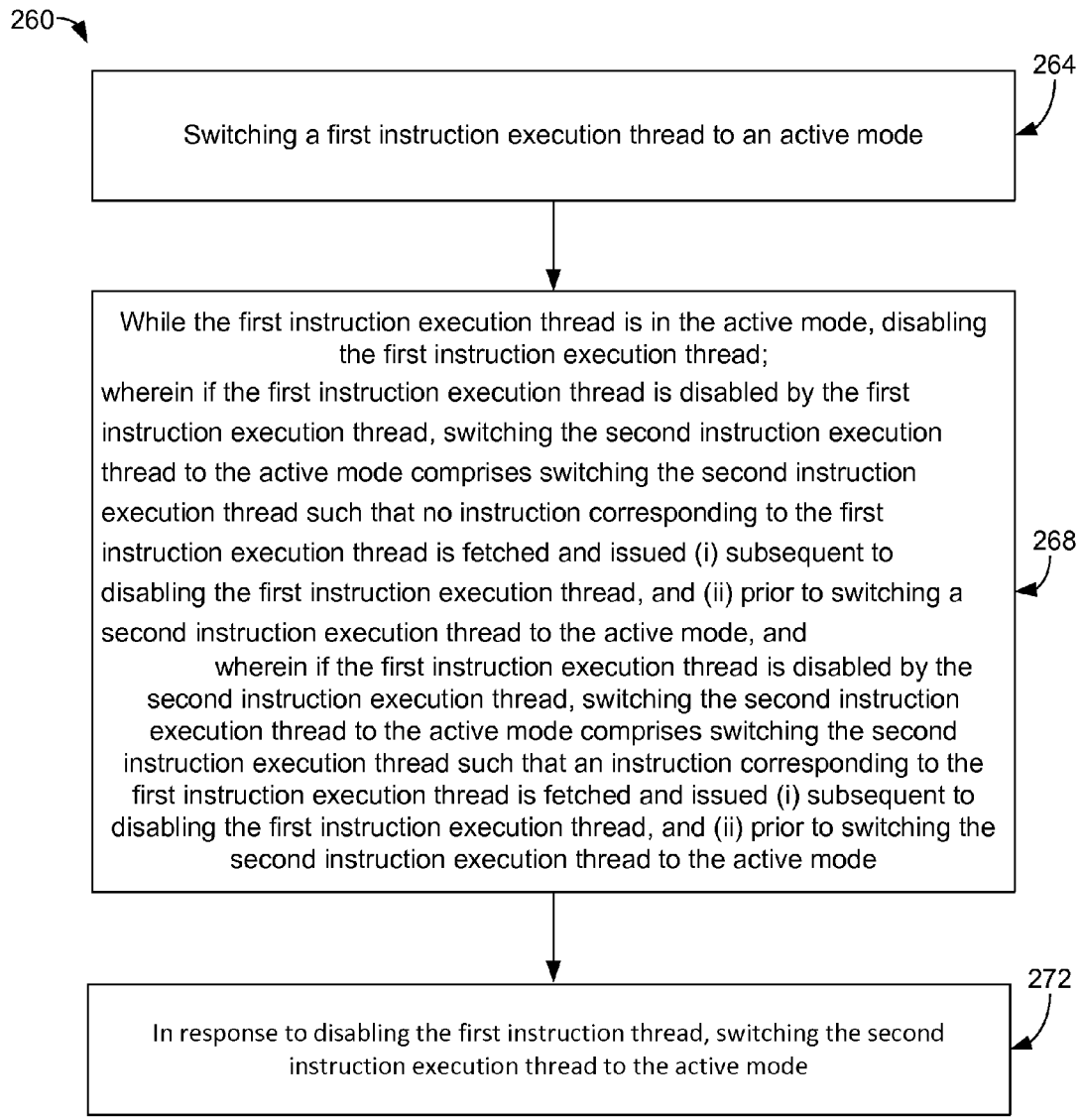
FIG. 2A is a flow diagram illustrating another method for handling switching among threads within a multithread processor.

Turning now to FIG. 2, methods in accordance with various embodiments are described in terms of computer firmware, software, and hardware with reference to a flow diagram. In various embodiments, portions of the methods to be performed by a processing device may constitute state machines or computer programs made up of computer-executable instructions. These instructions are typically maintained in a storage medium accessible by the processing device. Describing the methods by reference to flow diagrams enables one skilled in the art to develop such programs including such instructions to carry out the methods, and other methods in accordance with various embodiments of the present invention, on suitably configured processing devices, such as a multithread processor of a computing device executing the instruction execution threads from machine-accessible media. The computer-executable instructions may be written in a computer programming language or may be embodied in firmware logic. If written in a programming language conforming to a recognized standard, such instructions may be executed on a variety of hardware platforms and for interface to a variety of operating systems, such as multithread aware and non-multithread operating systems.

The various embodiments are not described with reference to any particular programming language. It will be appreciated by those skilled in the art that a variety of programming languages may be used to implement the teachings of at least one embodiment of the invention as described herein. Furthermore, it is common in the art to speak of software, in one form or another (e.g., program, procedure, process, application, etc.), as taking an action or causing a result. Such expressions are merely a shorthand way of saying that execution of the software by a network device causes the processor of the computer to perform an action or to produce a result.

Illustrated in FIG. 2 is a flow diagram of the operations associated with multithread handling by a multithread processing system 200 (e.g., such as ones previously described with reference to FIG. 1), in accordance with various embodiments. As illustrated, multithread processing system 200 may fetch and issue instructions of one or more instruction execution threads to an execution block for execution in block 210. As an example, multithread processing system 200 may fetch and issue one or more instructions of a master instruction execution thread T0 to an execution block for execution, fetch and issue one or more instructions of a second instruction execution thread T1 to an execution block for execution, and fetch and issue one or more instructions of a third instruction execution thread T2 to an execution block for execution. Multithread processing system 200 may fetch and issue instructions for more or less instruction execution threads, depending on the application.

In order to handle switching among threads within processing unit 110, a round robin thread switching method is employed. The amount of time spent in each thread is programmable via control registers 116. Each thread has a corresponding control register comprising, as an example, 32 bits. Each control register provides various control bits. For thread switching, the relevant bits are Thread Cycle Count bits (e.g., bits [23:16] of the control register) and Thread Enable bit (e.g., bit [0] of the control register). There are other fields in this exemplary 32 bit control register, but they are not important to the thread switching.

When all three threads are enabled, the switching order remains the same. Thread T0 switches to thread T1, thread T1 switches to thread T2, and then thread T2 switches back to thread T0. In the event that a thread is not enabled, then that thread is skipped. For example, if thread T2 is not enabled, but thread T0 and thread T1 are enabled, then when thread T1 is finished, instruction dispatch block 113 will see that thread T2 is not enabled. Instruction block 113 will then switch from thread T1 back to thread T0. Once in thread T0, the next thread will be thread T1, even if thread T2 was enabled by the time thread T0 was finished.

As an example, each thread has an 8 bit cycle count, which is used for counting the number of cycles a particular thread receives within processing unit 110. A setting of 0x01 represents 1 cycle, while 0xFF represents 255 cycles, and 0x00 represents the maximum of 256 cycles.

Each of the three threads has its own independent cycle counter 182. The initial value for the cycle counter is copied from the thread's respective control register. While the thread is the active thread in an instruction fetch (IF) stage within processing unit 110, the counter is updated every cycle. For example, the counter may be decremented by 1 every cycle. When the counter reaches 1, it is finished and instruction dispatch block 113 will attempt to switch to the next enabled thread, based on the switching order previously described. Those skilled in the art will understand that the updating may include incrementing the counter every cycle until a predetermined value is reached, as opposed to decrementing the counter every cycle until a value of 1 is reached. Likewise, those skilled in the art will understand that the counter may be updated by values larger or smaller than 1.

In accordance with various embodiments, if a thread in active mode disables itself, instruction dispatch block 113 will attempt to switch to the next enabled thread, based on the switching order previously described.

The threads' cycle counter will only reset back to the programmed cycle count, whenever there is a thread switch back to master thread T0. This includes the case where thread T0 "switches" back to itself due to threads T7 and T2 being disabled. A reason for such an implementation is to ensure fairness, so that a thread cannot simply reprogram its own thread counter while it is operating to keep itself going.

An implication of such an embodiment may be described as follows. Each thread is programmed to 0xFF (255 cycles). Thread T0 is currently in an active mode. While thread T0 is running, it reprograms thread T0 to 0x04 (4 cycles) and thread T1 to 0x08 (8 cycles). Thread T0 will ignore the reprogramming for its own cycle count and continue going for the full 255 cycles. When thread T0 is finished executing and switches into thread T1, thread T1 will still run for 255 cycles. Thread T2 will then run for 255 cycles and switch to thread T0. Upon switching back to thread T0, all of the cycle counters (which were in the finished state) will revert to the newly programmed count. In this case, thread T0 will now become 0x04, thread T1 will become 0x08, and thread T2 will become 0xFF. Thread T0 will now run for 4 cycles and switch to thread T1 for 8 cycles, and finally thread T2 for 255 cycles.

In accordance with various embodiments, whenever a disabled thread becomes enabled, it will take in any newly programmed cycle count. For example, assume instruction dispatch block 113 is currently in thread T0, thread T1 is enabled with 100 cycles, and thread T2 is disabled with 100 cycles programmed. Thread T0 then programs thread T2's cycle count from 100 to 200 cycles. While the instruction dispatch block 113 is still in thread T0, thread T2 is then enabled. The next thread switch will go from thread T0 to thread T1. When thread T1 switches to thread T2, the cycle counter will be 200 cycles, even though there has not been a "switch back to thread T0". This is because thread T2 was disabled at the time it was programmed.

When all the threads are enabled and running, the switching order and timing are easy to determine. Some extra consideration needs to be taken for cases when threads disable themselves and/or yield (a form of temporary disablement). In accordance with various embodiments, a yield occurs when a thread is in an active mode and "yields" control of processing unit 110 to another thread, i.e., the another thread becomes the thread in the active mode and the "yielded" thread is temporarily disabled. In such an instance, the yielded thread is enabled for its next turn in the round robin scheduling of threads and upon its return to the active mode, the yielded thread's cycle count is reset back to its full value. Thus, if a thread yields, when it returns to itself it will have the full cycle count as determined by its control register. In accordance with various embodiments, any instructions remaining in the pipeline for the yielded thread are flushed and execution will resume at the instruction that was next when the yield instruction was executed.

In accordance with various embodiments, when an exception occurs, all the threads will be stopped and the thread (that causes exception) will execute the exception handler. An exception allows a thread in active mode to exceed its cycle count in order to complete a set of instructions. Thus, while it is in exception mode, the cycle count for that thread will continue to run. However, the processor will not switch to a new thread during the exception. Thus, if the cycle counter reaches 0x01, but the exception is not completed, the processor will remain in the thread until the exception finishes. When the exception finishes, instruction dispatch block 113 will see the cycle counter at 0x01 and switch accordingly. If the exception finishes and the cycle counter still has regular, remaining cycles, then things continue with the round robin handling method as described above.

In accordance with various embodiments, for interrupts, which have been previously described and which may be viewed as a temporary disablement of a thread, the same behavior will occur as in the exception case (no thread switching), if a priority interrupt bit (bit 1 of the control register) is set, for example, if the priority interrupt bit is set high. This bit determines whether or not thread switching is disabled when an interrupt is encountered. This bit is independent by thread, which means that each thread can set this bit differently. When an interrupt comes in for a particular thread, this bit is checked by instruction dispatch block 113. In this example, if it is high, then thread switching will be disabled until the interrupt service routine as finished. If the bit is low, then thread switching will still occur and the interrupt service routine is executed as the thread uses its regularly allocated cycles.

For an exception or interrupt that ends up flushing the pipeline, in accordance with various embodiments, the cycle count for all of the threads will be reset. This is an exception to the rule described previously. The reason for this is to prevent starvation of a thread. For example, if thread T2 is active and thread T1 causes an exception that flushes the pipeline, all of the T2 instructions will be flushed. When the instruction dispatch block 113 returns the round robin method, thread T2 will have exhausted its entire cycle count, so the instruction dispatch block will switch to thread T0. If thread T1 constantly hits an exception in this manner, thread T2 will be starved.

In accordance with various embodiments, when a thread performs a yield instruction, a thread switch occurs after the yield instruction retires. Any instructions still in the pipeline for those threads are flushed. An exception to this occurs when an interrupt/exception arrives on a yield instruction. In these cases, the interrupt/exception will take place, which means the yield instruction is effectively ignored, since the instruction dispatch block 113 will remain in the thread. The cycle count is still reset in the manner described previously with respect to yields. Thus, if a thread yields, when it returns to itself it will have the full cycle count as determined by its control register.

Accordingly, with reference to FIG. 2, a thread executes instructions (202) until its cycle count is complete, until it is yielded or disables itself (204) (or until it is interrupted as described above). If the cycle count is complete and the thread was executing instructions based upon an interrupt (with priority bit set) or was in an exception mode, the thread continues until the instructions are complete (206). Multithread processing system 200 switches to the next enabled thread (208) when the cycle count is complete, the interrupt is complete, the exception is complete, the yield is complete, or the thread has disabled itself. If the new thread is a master thread, then all cycle counts are reset (210, 212).

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
   switching a first instruction execution thread to an active mode;
   while the first instruction execution thread is in the active mode, disabling the first instruction execution thread; and
   in response to disabling the first instruction thread, switching a second instruction execution thread to the active mode,
   wherein if the first instruction execution thread is disabled by the first instruction execution thread, switching the second instruction execution thread to the active mode comprises switching the second instruction execution thread such that no instruction corresponding to the first instruction execution thread is fetched and issued (i) subsequent to disabling the first instruction execution thread, and (ii) prior to switching the second instruction execution thread to the active mode, and
   wherein if the first instruction execution thread is disabled by the second instruction execution thread, switching the second instruction execution thread to the active mode comprises switching the second instruction execution thread such that an instruction corresponding to the first instruction execution thread is fetched and issued (i) subsequent to disabling the first instruction execution thread, and (ii) prior to switching the second instruction execution thread to the active mode.

2. The method of claim 1, further comprising:
   in response to disabling the first instruction execution thread, preventing the first instruction execution thread from entering the active mode.

3. The method of claim 1, further comprising:
   prior to disabling the first instruction thread, locking the first instruction execution thread.

4. The method of claim 1, wherein the first instruction execution thread remains disabled until a master instruction execution thread enables the first instruction execution thread.

5. The method of claim 1, further comprising:
   interrupting the second instruction execution thread while the second instruction execution thread is in the active mode; and
   subsequent to the interrupting the second instruction execution thread, fetching and issuing one or more instructions corresponding to the second instruction execution thread.

6. The method of claim 5, wherein fetching and issuing the one or more instructions corresponding to the second instruction execution thread further comprises:
continuing to fetch and issue the one or more instructions corresponding to the second instruction execution thread until the one or more instructions are completed.

7. The method of claim 6, wherein continuing to fetch and issue the one or more instructions corresponding to the second instruction execution thread further comprises:
continuing to fetch and issue the one or more instructions corresponding to the second instruction execution thread in response to an interrupt priority bit associated with the second instruction execution thread being set.

8. The method of claim 1, wherein disabling the first instruction execution thread further comprises:
setting, to a disable mode, a thread control bit of a thread control register associated with the first instruction execution thread; and
disabling the first instruction execution thread in response to setting the thread control bit.

9. The method of claim 8, wherein the setting the thread control bit further comprises:
setting the thread control bit (i) by the first instruction execution thread or (ii) by the second instruction execution thread.

10. The method of claim 8, wherein the setting the thread control bit further comprises:
if (i) the first instruction execution thread is a child instruction execution thread and (ii) the second instruction execution thread is a master instruction execution thread, allowing the second instruction execution thread to set the thread control bit.

11. The method of claim 10, further comprising:
if (i) the first instruction execution thread is the master instruction execution thread and (ii) the second instruction execution thread is the child instruction execution thread, preventing the second instruction execution thread from setting the thread control bit.

12. The method of claim 1, further comprising:
determining whether the first instruction execution thread is disabled by the first instruction execution thread or by the first instruction execution thread,
wherein switching the second instruction execution thread to the active mode comprises switching the second instruction execution thread to the active mode, based on determining whether the first instruction execution thread is disabled by the first instruction execution thread or by the first instruction execution thread.

13. An apparatus comprising:
an execution block configured to execute instructions; and
an instruction dispatch block operatively coupled to the execution block, the instruction dispatch block configured to
switch a first instruction execution thread to an active mode, and
disable the first instruction execution thread while the first instruction execution thread is in the active mode,
wherein if the first instruction execution thread is disabled based on an instruction from the first instruction execution thread, the instruction dispatch block is configured to switch a second instruction execution thread to the active mode such that no instruction corresponding to the first instruction execution thread is fetched and issued (i) subsequent to disabling the first instruction execution thread, and (ii) prior to switching the second instruction execution thread to the active mode, and
wherein if the first instruction execution thread is disabled based on an instruction from the second instruction execution thread, the instruction dispatch block is configured to switch the second instruction execution thread to the active mode such that an instruction corresponding to the first instruction execution thread is fetched and issued (i) subsequent to disabling the first instruction execution thread, and (ii) prior to switching the second instruction execution thread to the active mode.

14. The apparatus of claim 13, wherein the instruction dispatch block is further configured to, in response to disabling the first instruction execution thread, prevent the first instruction execution thread from entering the active mode.

15. The apparatus of claim 13, wherein the instruction dispatch block is further configured to interrupt the second instruction execution thread while the second instruction execution thread is in the active mode.

16. The apparatus of claim 15, wherein the instruction dispatch block is further configured to, subsequent to the interrupting the second instruction execution thread, fetch and issue one or more instructions corresponding to the second instruction execution thread.

17. The apparatus of claim 16, wherein the instruction dispatch block is further configured to fetch and issue the one or more instructions corresponding to the second instruction execution thread until the one or more instructions corresponding to the second instruction execution thread are complete.

18. The apparatus of claim 16, wherein the instruction dispatch block is further configured to fetch and issue the one or more instructions corresponding to the second instruction execution thread based on an interrupt priority bit being set.

19. The apparatus of claim 13, further comprising:
a thread control register associated with the first instruction execution thread, the thread control register including a thread bit that is set to a disable mode to disable the first instruction execution thread.

20. The apparatus of claim 19, wherein if (i) the first instruction execution thread is a child instruction execution thread and (ii) the second instruction execution thread is a master instruction execution thread, the thread control register is configured to allow the second instruction execution thread to set the thread control bit.

21. The apparatus of claim 20, wherein if (i) the first instruction execution thread is the master instruction execution thread and (ii) the second instruction execution thread is the child instruction execution thread, the thread control register is configured to prevent the second instruction execution thread from setting the thread control bit.

* * * * *